(12) United States Patent
Annamalai Thangaraj et al.

(10) Patent No.: US 10,965,824 B2
(45) Date of Patent: Mar. 30, 2021

(54) METHODS AND SYSTEMS FOR PRINT JOBS TRANSFER VIA AN EXTERNAL STORAGE DEVICE

(71) Applicant: XEROX CORPORATION, Norwalk, CT (US)

(72) Inventors: Sathish Kumar Annamalai Thangaraj, Chennai (IN); Narayan Kesavan, Chennai (IN); Muralidaran Krishnasamy, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/365,762

(22) Filed: Mar. 27, 2019

(65) Prior Publication Data
US 2020/0314265 A1 Oct. 1, 2020

(51) Int. Cl.
 H04N 1/00 (2006.01)
 G06F 3/12 (2006.01)
 H04N 1/21 (2006.01)

(52) U.S. Cl.
 CPC ....... *H04N 1/00411* (2013.01); *G06F 3/1204* (2013.01); *G06F 3/126* (2013.01); *G06F 3/128* (2013.01); *G06F 3/1238* (2013.01); *G06F 3/1257* (2013.01); *G06F 3/1261* (2013.01); *H04N 1/00485* (2013.01); *G06F 3/1285* (2013.01); *H04N 1/00472* (2013.01); *H04N 1/21* (2013.01)

(58) Field of Classification Search
None
See application file for complete search history.

(56) References Cited

U.S. PATENT DOCUMENTS

| | | | |
|---|---|---|---|
| 2006/0181729 A1* | 8/2006 | Kuribara | G06F 21/608 358/1.14 |
| 2006/0262356 A1* | 11/2006 | Honda | H04N 1/00347 358/400 |
| 2011/0242580 A1* | 10/2011 | Tran | G06F 3/1205 358/1.15 |
| 2012/0320418 A1* | 12/2012 | Saka | H04N 1/00204 358/1.15 |
| 2015/0029538 A1* | 1/2015 | Okamoto | H04N 1/00925 358/1.14 |
| 2018/0210681 A1* | 7/2018 | Pantin | G06F 3/1204 |

* cited by examiner

*Primary Examiner* — Miya J Williams
(74) *Attorney, Agent, or Firm* — Jones Robb, PLLC

(57) ABSTRACT

System(s) and method(s) for transferring print jobs from a multi-function device to an external storage device are described. The method includes detecting the external storage device by the multi-function device when the external storage device is connected to the multi-function device. The method further includes determining if there is a print job of a user in a print queue of the multi-function device and displaying an option to transfer the print job to the external storage device based on the determination. The method includes receiving an input from the user, the input is indicative of a selection of the option to transfer the print job. Also, the method includes automatically creating a pre-defined folder in the external storage device based on receiving the input and transferring the print job of the user from the print queue of the multi-function device to the pre-defined folder of the external storage device.

29 Claims, 11 Drawing Sheets

METHODS AND SYSTEMS FOR PRINT JOBS TRANSFER VIA AN EXTERNAL STORAGE DEVICE

TECHNICAL FIELD

The present disclosure relates generally to the field of printing and, in particular, to systems and methods for print jobs transfer via an external storage device.

BACKGROUND

Typically, to print a document, a user selects a print command from an application program running on a host system to initiate print services on a multi-function device. The document submitted for printing is referred to as a print job. The multi-function device receives the print job and adds the print job to its print queue along with other print jobs, and then performs printing on a first-come first-served manner.

However, in certain circumstances, a multi-function device may not be able to execute or finish execution of a print job. For instance, the multi-function device may experience an error, for example, paper jam or fuser issue that requires the multi-function device to be serviced before resuming printing. As another instance, the multi-function device may run out of printing resources, such as paper, toner, etc., necessary to perform printing, which must be replenished before carrying out printing. As yet another instance, a user who has submitted a print job to the multi-function device may not wish to continue with the printing of the print job at that point of time owing to various reasons, such as the user may find image quality on printed sample documents of the multi-function device to be poor or the user may wish to run the print job at a later point in time as the user may be in a hurry or the user wishes to allow other users to use the multi-function device before him as his print job may consume more time. In such circumstances, the multi-function device may halt the printing operation, preventing the print job from being executed or prematurely ending the print job in progress.

Various print job redirection techniques have been employed in the past where a multi-function device redirects a print job of a user to another suitable multi-function device that is communicatively coupled through a network. The multi-function device redirects the print job to another multi-function device for execution when the multi-function device to which the print job has been sent is, for some reason, not capable of executing the print job. However, such print job redirection techniques are autonomous and do not take user's consent and preferences/reasons into account while redirecting the print job. Further, in an event of network failure, the print job redirection techniques fail to work. Further, the conventional print job redirection techniques may not work in situations where a user does not wish to continue with the printing of the print job by the multi-function device at that point of time owing to various reasons as discussed above. In view of the above, there is a need for improved methods and systems.

SUMMARY

According to aspects illustrated herein, a method for transferring print jobs from a multi-function device to an external storage device is described. The method includes detecting the external storage device by the multi-function device when the external storage device is connected to the multi-function device. It is then determined if there is a print job of a user in a print queue of the multi-function device. An option to transfer the print job to the external storage device is displayed based on the determination of the print job of the user. An input is received from the user, where the input is indicative of a selection of the option to transfer the print job to the external storage device. A pre-defined folder is created in the external storage device based on receiving the input. Finally, the print job of the user is transferred from the print queue of the multi-function device to the pre-defined folder of the external storage device for later retrieval and/or printing.

According to further aspects illustrated herein, a method for transferring one or more print jobs from a multi-function device to another multi-function device via an external storage device is disclosed. The method includes detecting the external storage device by the multi-function device when the external storage device is connected to the multi-function device. Then, one or more pending jobs corresponding to a user, in a print queue of the multi-function device are identified, when the user connects the external storage device to the multi-function device. A job transfer option is displayed, via a user interface, to transfer the job to the external storage device based on the identification of the one or more pending jobs. A list of the one or more pending jobs of the user is displayed, via the user interface. A selection of one or more pending jobs from the displayed list is received, via the user interface. The selected pending jobs are transferred from the print queue of the multi-function device along with job details to a pre-defined folder of the external storage device. The external storage device is received by another multi-function device, the external storage device includes the pre-defined folder having the transferred pending jobs and the job details. The pre-defined folder having the pending jobs and the job details is identified by another multi-function device. The job along with the job details are transferred from the external storage device to a print queue of another multi-function device. Finally, the print job is printed by another multi-function device according to the job details.

According to furthermore aspects illustrated herein, a job transfer system is described. The job transfer system includes a detecting module to detect the external storage device when the external storage device is connected to the multi-function device. Further, the job transfer system includes a determining module to determine if there is a print job of a user in a print queue of the multi-function device. The job transfer system further includes a displaying module to display a job transfer option to transfer the print job to the external storage device based on the determination of the print job of the user. The displaying module further receives an input from the user, where the input is indicative of a selection of the job transfer option to transfer the print job to the external storage device. The job transfer system further includes a generating module to automatically create a pre-defined folder in the external storage device based on receiving the input, and a transferring module to transfer the print job of the user from the print queue of the multi-function device to the pre-defined folder of the external storage device along with job details.

According to aspects illustrated herein, a multi-function device is described. The multi-function device includes a peripheral port to receive an external storage device. The multi-function device further includes a job transfer system in communication with the peripheral port. The job transfer system includes a detecting module to detect the external storage device when the external storage device is connected to the multi-function device. Further, the job transfer system includes a determining module to determine if there is a print job of a user in a print queue of the multi-function device. The job transfer system includes a displaying module to display a job transfer option to transfer the print job to the external storage device based on the determination of the print job of the user. The displaying module receives an input from the user, where the input is indicative of a selection of the job transfer option to transfer the print job to the external storage device. The job transfer system further includes a generating module to automatically create a pre-defined folder in the external storage device based on receiving the input, and a transferring module to transfer the print job of the user from the print queue of the multi-function device to the pre-defined folder of the external storage device.

According to furthermore aspects illustrated herein, a non-transitory computer-readable medium comprising instructions executable by a processing resource is described. The processing resource is to detect the external storage device by the multi-function device when the external storage device is connected to the multi-function device. The processing resource further is to determine if there is a print job of a user in a print queue of the multi-function device. Further, the processing resource is to display an option to transfer the print job to the external storage device based on the determination of the print job of the user. The processing resource further is to receive an input from the user, where the input is indicative of a selection of the option to transfer the print job to the external storage device. Also, the processing resource is to automatically create a pre-defined folder in the external storage device based on receiving the input and transfer the print job of the user from the print queue of the multi-function device to the pre-defined folder of the external storage device.

According to aspects illustrated herein, a system is disclosed. The system includes a multi-function device and another multi-function device. The multi-function device is to detect an external storage device when the external storage device is connected to the multi-function device; determine if there is a print job of a user in a print queue of the multi-function device; display a job transfer option to transfer the print job to the external storage device based on the determination of the print job of the user; receive an input from the user, wherein the input is indicative of a selection of the job transfer option to transfer the print job to the external storage device; create a pre-defined folder in the external storage device based on receiving the input; and transfer the print job of the user from the print queue of the multi-function device to the pre-defined folder of the external storage device, along with job details. The another multi-function device is to receive the external storage device storing the print job and job details; identify the pre-defined folder present in the external storage device when the external storage device is connected to another multi-function device; automatically load the print job and the job details from the external storage device, into a print queue of another multi-function device, when the external storage device is connected to another multi-function device; and print the print job in accordance with the job details.

Other and further aspects and features of the disclosure will be evident from reading the following detailed description of the embodiments, which are intended to illustrate, not limit, the present disclosure.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1A:
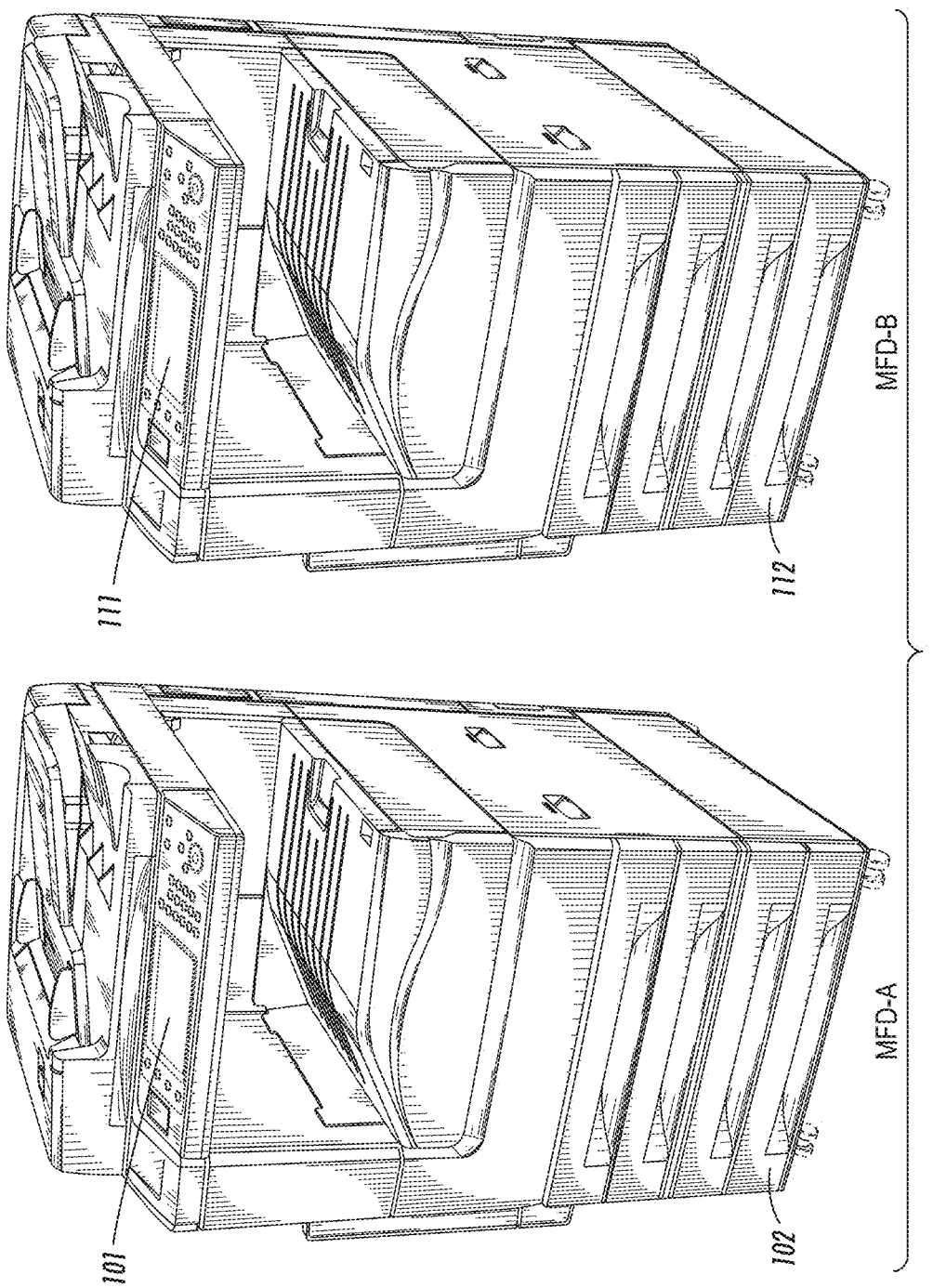
FIG. 1A illustrates exemplary physical multi-function devices.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below.

The term "multi-function device" refers to a single device that performs multiple separate functionalities, such as printing, scanning, copying, imaging, faxing, and the like. The multi-function device includes software, hardware, firmware, or combination thereof. The multi-function device may participate in a network and communicate with various devices such as other multi-function devices, computing devices, users, or any combination thereof. In context of the present disclosure, the multi-function device is capable of transferring one or more print jobs along with corresponding job details from its print queue to an external storage device. Further, the multi-function device is capable of populating/transferring print jobs from an external storage device to its print queue.

"Another multi-function device" is a multi-function device different from the multi-function device mentioned above and has the same job transfer capabilities as of the multi-function device above.

The term "job transfer system" is the one that transfers job from one multi-function device to an external storage device. Further, the job transfer system transfers the job from the external storage device to another multi-function device and/or the same multi-function device.

The term "external storage device" refers to any storage device that can be connected to the multi-function device. The external storage device stores data such as documents, files, folders or any other type of data in any format. Few non-limiting examples of the external storage device include a Universal Serial Bus (USB) device, a hard disk, a memory card, a SD card, a CD, or other forms of external storage device. The external storage device may interchangeably be used with the term "storage device," or "external device," or "portable device." In context of the present disclosure, the external storage device stores one or more print jobs which are pending, along with corresponding job details.

The term "print job" is a job submitted by the user in the form of a page description language (PDL) document such as PostScript (PS), Portable Document Format (PDF) and Extensible Markup Language (XML) Paper Specification (XPS). The print job includes a document having multiple pages. Each page is associated with a page number or may have any other page identifier. The print job has one or more job attributes.

The term "pre-defined folder" refers to a folder created by a user or automatically by a multi-function device/the job transfer system. The pre-defined folder stores one or more print jobs along with the job details, to be printed by the multi-function device/another multi-function device. The print jobs are stored in a Job Definition Format (JDF) or Page Description Language (PDL) format in the external storage device. The pre-defined folder can also be a storage space for applications, documents, files, data, other subfolders, etc., that can be retrieved, moved, and manipulated.

The term "authorized user" refers to users who are registered with the multi-function device/another multi-function device for using services. The term "privileged user" refers to users who have rights to prioritize their print jobs and additional rights. In context of the present disclosure, the privileged users can create a pre-defined folder in the external storage device or can change the name of the pre-defined folder in order to prioritize their print jobs. It is understood that all privileged users are authorized users.

Exemplary Embodiments

There are situations when a user submits a job such as a print job to a multi-function device but before the job reaches the top of a print queue, he wishes to remove it from the queue owing to one or more reasons. For example, the user finds the image quality to be poor; the multi-function device is in a bad state owing to paper jams, fuser issues, etc.; the multi-function device is low on resources—media, toner, etc.; the user is in a hurry and wishes to run his job at a later point in time or the user wishes to allow other users behind him to use the multi-function device as his job may take up more time. Several solutions are available in the market to help find the user another multi-function device or a printer for printing his job, but the existing solutions may not work for the user in all the circumstances as discussed above or requires network or do not consider the user's consent/preferences.

To overcome the above problems, the present disclosure discloses methods and systems for transferring print jobs from a multi-function device to an external storage device that the user does not wish to be executed by the multi-function device or wishes to execute the print jobs later. The transferred print jobs can then be populated into another multi-function device or the same multi-function device from the external storage device when the user wishes to print the jobs. In this manner, the methods and systems assist the user in running his print jobs at a more convenient time without having to reconfigure it from scratch or without requiring network connectivity.

To enable this, the present disclosure provides a job transfer system and its methods of implementation. The job transfer system transfers the user's print job along with job details from a print queue of the multi-function device to an external storage device. The job and the job details are stored in a pre-defined folder in a pre-defined format such as JDF or PDL. The job and job details are stored in the pre-defined folder such that the stored job and job details are readable by another multi-function device. When the user plugs-in the external storage device into another multi-function device, another multi-function identifies the pre-defined folder and any jobs stored in the pre-defined folder. Upon identification, another multi-function device populates the job and job details to its job queue based on the pre-defined folder for printing. In this manner, the job transfer system provides a way for the user to clean up his job queue in the multi-function device and converts his job into instantly transferable jobs (rather than having to reconfigure them). Additionally, the job transfer system enables the user to quickly move his jobs to a different multi-function device if (for example) the originally targeted multi-function device is faulted or is currently busy printing other jobs.

The job transfer system can be in the form of software, hardware or a combination thereof. The job transfer system is a part of the multi-function device but can be implemented in other possible ways.

FIG. 1A shows exemplary physical multi-function devices such as a multi-function device A (MFD-A) 102 and a multi-function device B (MFD-B) 112 for implementing the present disclosure. The MFD-A 102 and MFD-B 112 are similar in structure and functionalities. Alternatively, the MFD-A 102 and MFD-B 112 may differ in their structure and functionalities without limiting the scope of the disclosure. The MFD-A 102 and MFD-B 112 perform printing of documents as received from various users. In addition to printing, the MFD-A 102 and MFD-B 112 may include additional functionalities such as scanning, faxing, copying, imaging or the like. As shown, the MFD-A 102 and MFD-B 112 are standalone devices, but the MFD-A 102 and MFD-B 112 may be a part of network communicatively coupled to each other and other devices.

The MFD-A 102 is a multi-function device to which a user originally submits a print job for printing. Due to various reasons or scenarios discussed above, the user does not want to continue printing his print job at the MFD-A 102 and thus, the user transfers the print job from the MFD-A 102 to an external storage device. The MFD-B 112 is a multi-function device to which the user transfers the print job from the external storage device to the MFD-B 112. The MFD-B 112 is referred to as another multi-function device. The MFD-A 102 and MFD-B 112 forms a system, where the MFD-B 112 represents another multi-function device.

Typically, the MFD-A 102 receives a print job from a user through one or more ways. Upon receiving, the MFD-A 102 adds the received print job to its print queue. Due to one or more reasons, the user wishes to transfer his print job from the MFD-A 102 and further wishes to print his job at the MFD-B 112. In context of the present disclosure, the MFD-A 102 transfers the print job of the user from its print queue to the MFD-B 112 via an external storage device. The MFD-A 102 first stores the received print job in the external storage device along with job details. The user then connects the external storage device to the MFD-B 112. The MFD-B 112 then retrieves the job stored in the external storage device and adds the stored job along with the job details to its print queue. Finally, the MFD-B 112 prints the transferred job. More details are discussed in conjunction with subsequent figures.

The print job may be a normal job, a secure job, a delayed job, and so on. The delayed job is the one which is scheduled for printing at a specific time say, 11:00 AM, and so on. The print job is the job pending in the print queue of the MFD-A 102.

Figure 1B:
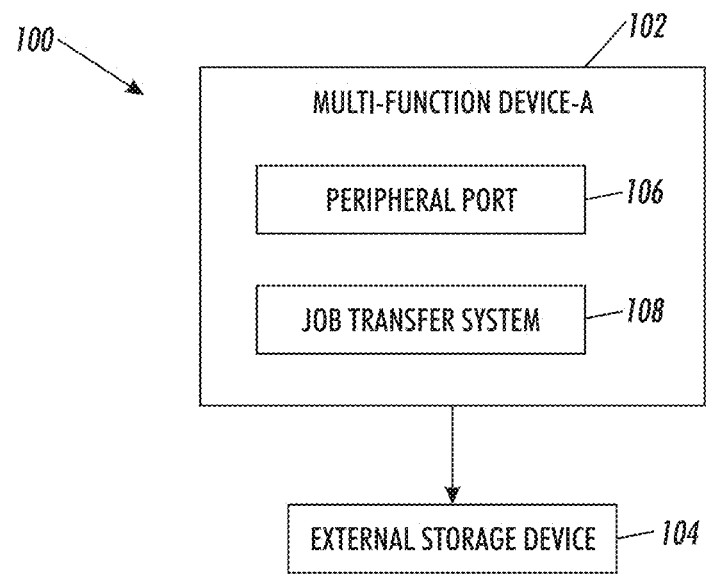
FIGS. 1B and 1C illustrate exemplary environments for transferring print jobs, according to an example embodiment of the present disclosure.
Figure 1C:
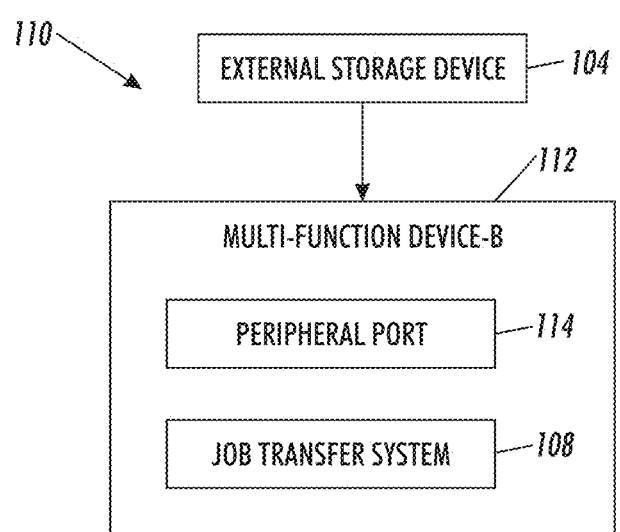

FIGS. 1B and 1C illustrate exemplary environments 100, 110 for transfer of print jobs, according to an example embodiment of the present disclosure. FIG. 1A illustrates the environment 100 for transfer of a print job from a multi-function device to an external storage device. In an example embodiment, the environment 100 includes a multi-function device-A (MFD-A) 102 and an external storage device 104. The MFD-A 102 is capable of performing printing, scanning, copying, and/or faxing, among other operations. Various examples of the MFD-A 102 may be a multi-function peripheral device, a printer, a multi-function printer or the like. The external storage device 104 stores data, documents, file, etc., in known or later developed formats. Various examples of the external storage device 104 include, but not limited to, a Universal Serial Bus (USB) device, a hard disk, a memory card, a CD, or a combination thereof.

In the shown environment 100, the MFD-A 102 includes a peripheral port 106 and a job transfer system 108. In said example embodiment, the peripheral port 106 and the job transfer system 108 are in communication with each other to perform the functionalities of the MFD-A 102. The external storage device 104 is communicatively coupled to the MFD-A 102 via the peripheral port 106 of the MFD-A 102. In an example, the peripheral port 106 may be a Universal Serial Bus (USB) port. In another example, the peripheral port 106 may be any suitable port or connector that facilitates communication between the external storage device 104 and the MFD-A 102.

The MFD-A 102 may further include one or more additional components as required to implement the present disclosure. For example, the MFD-A 102 includes a user interface 101. The user interface 101 facilitates an interaction of the MFD-A 102 with a user of the external storage device 104, such as to receive an input from the user and to provide an output to the user. For instance, the user interface 101 displays various options to the user such as job transfer option or other default options. The user interface 101 further displays messages to the user such as job successful messages, and so on. In an example, the user interface 101 may include components, such as a keypad, buttons, a touch pad, a joystick, an additional display, a touch screen, or any other component that facilitates interaction between the user and the MFD-A 102.

In an example embodiment, the user submits a job such as a print job to the MFD-A 102 via one or more ways. For example, the user submits the print job via his computing device. In another example, the user submits the print job through a gateway. These are two examples; the user can submit the print job through other ways. While submitting the print job, one or more job attributes are submitted. Various examples of the job attributes include such as color print, black & white print, a number of copies, simple or duplex printing and so on. The job and the job attributes are received by the MFD-A 102. The print job is added to a print queue of the MFD-A 102. Due to one or more reasons discussed above, it is considered that the user does not wish to continue with printing his job at the MFD-A 102 and decides to remove his print job from the MFD-A 102 and wishes to print his job at another multi-function device for example, MFD-B 112.

According to such example embodiment, the user first transfers his print job from the MFD-A 102 to the external storage device 104. In said embodiment, the user connects the external storage device 104 to the MFD-A 102 by plugging-in the external storage device 104 into the peripheral port 106 of the MFD-A 102. Accordingly, the peripheral port 106 of the MFD-A 102 receives the external storage device 104 of the user. In an example, the user is an authorized user. The authorized user may be understood as a user who can access the MFD-A 102 using credentials, such as a username and a password.

Subsequently, the job transfer system 108 detects the external storage device 104 when the external storage device 104 is connected to the MFD-A 102. When the job transfer system 108 detects the external storage device 104, the job transfer system 108 determines if there is any print job of the user in a print queue of the MFD-A 102. If the print job of the user is pending in the print queue of the MFD-A 102, then only the job transfer system 108 displays an option, i.e., a job transfer option to the user to transfer the print job to the external storage device 104. In an example, the job transfer system 108 may display an option "Transfer jobs to USB" on the user interface 101 of the MFD-A 102.

If the user wishes to transfer the print job to the external storage device 104, then user selects the option to transfer the print job. The job transfer system 108 receives an input from the user. The input is indicative of a selection of the option to transfer the print job to the external storage device 104. In an example, the input may be a touch input or a button input. Further, based on receiving the input, the job transfer system 108 creates a pre-defined folder in the external storage device 104. In an example, the job transfer system 108 may create a folder named "job_transfer" folder. In another example, the job transfer system 108 may create a folder named "Insta-job print." Once the pre-defined folder is created, the job transfer system 108 transfers the print job of the user and respective job details from the print queue of the MFD-A 102 to the pre-defined folder of the external storage device 104. Examples of the job details of the print job include, but are not limited to, a unique identification number of the print job, job name, passcode of the print job, time to print and other print details such as job attributes as submitted by the user at the time of submitting the print job. In this manner, the print job is transferred from the MFD-A 102 to the external storage device 104 of the user. The user can connect the external storage device 104 to any multi-function device for printing his print job. One such multi-function device is MFD-B 112.

FIG. 1C illustrates the environment 110 for transfer of print jobs from the external storage device to another multi-function device. In an example embodiment, the environment 110 includes a multi-function device-B (MFD-B) 112 and the external storage device 104.

In an example embodiment, the MFD-B 112 includes a peripheral port 114 and the job transfer system 108. In said example embodiment, the peripheral port 114 and the job transfer system 108 are in communication with each other to perform the functionalities of the MFD-B 112. The external storage device 104 is communicatively coupled to the MFD-B 112 via the peripheral port 114 of the MFD-B 112. In an example, the peripheral port 114 may be a USB port. In another example, the peripheral port 114 may be any suitable port or connector that facilitates communication between the external storage device 104 and the MFD-B 112.

The MFD-B 112 may further include one or more additional components as required to implement the present disclosure. In an example embodiment, the MFD-B 112 includes a user interface 111. The user interface 111 may facilitate an interaction of the MFD-B 112 with the user of the external storage device 104, such as to receive an input from the user and to provide an output to the user. For instance, the user interface 111 may display various options to the user such as job transfer option or other default options. The user interface 111 further displays messages to the user such as job successfully printed, or other messages. In an example, the user interface 111 may include components, such as a keypad, buttons, a touch pad, a joystick, an additional display, a touch screen, or any other component that facilitates interaction between the user and the MFD-B 112.

In the environment 110, the external storage device 104 includes the print job along with job details according to the example embodiment as discussed in FIG. 1B. The print job is the job transferred from the print queue of the MFD-A 102 to the external storage device 104.

According to an example embodiment, when the user wishes to transfer his print jobs from the external storage device 104 to the MFD-B 112, the user connects the external storage device 104 to the MFD-B 112. In said embodiment, the user connects the external storage device 104 to the MFD-B 112 by plugging-in the external storage device 104 into the peripheral port 114 of the MFD-B 112. Accordingly, the peripheral port 114 of the MFD-B 112 receives the external storage device 104 of the user. The external storage device 104 stores the transferred print and the job details.

Subsequently, the job transfer system 108 detects the external storage device 104 connected to the MFD-B 112. The job transfer system 108 then identifies if there is a pre-defined folder having at least one print job in the external storage device 104. The pre-defined folder also includes job details of the at least one print job. Based on the identification the pre-defined folder having the at least one print job, the job transfer system 108 retrieves the at least one print job and the job details from the external storage device 104, and automatically populates a print queue of the MFD-B 112 with the retrieved print job for printing. The print job is populated to the print queue based on the pre-defined folder, such as name of the pre-defined folder. But the print job can be populated based on other parameters of the pre-defined folder. In an example, if the external storage device 104 includes a folder named "job_transfer," then the job transfer system 108 moves the print job to a next available slot in the print queue. In another example, if the external storage device 104 includes a folder named "Insta-job print," then the job transfer system 108 moves the print job to the top of the print queue such that the print job is instantly printed on priority basis. In the pre-defined folder, "Insta-job print," the phrase "insta" indicates instant printing of the job is required. In such cases where the pre-defined folder is "Insta-job print," the print job stored is automatically printed, without requiring user intervention. Finally, the print job of the user, which is initially submitted to the MFD-A 102, is transferred to the MFD-B 112 for printing via the external storage device 104. The MFD-B 112 prints the job according to the job details.

In an example embodiment, once the print job is transferred from the external storage device 104 to the print queue of the MFD-B 112, the user may enter passcode of the print job and release the print job in case the print job is a secure print job. Thus, the secured print job is successfully printed by MFD-B 112. In this manner, the print job of the user is converted into instantly transferable print job, without having to reconfigure the print job.

For easy understanding, FIGS. 1A, 1B and 1C are discussed with respect to transferring a print job from one multi-function device, i.e., MFD-A 102 to a different/another multi-function device, i.e., MFD-B 112 via an external storage device, i.e., external storage device 104. In such cases, the print job is first transferred from the MFD-A 102 to the external storage device 104 and the print job is further transferred from the external storage device 104 to the MFD-B 112. Such case scenarios may be implemented when the MFD-A 102 is not working due to various reasons. But the disclosure can also be implemented with respect to transferring a print job from a multi-function device, i.e., MFD-A 102 to the same multi-function device, i.e., MFD-A 102 via the external storage device 104. In such cases, the print job is first transferred from the MFD-A 102 to the external storage device 104 and the print job is further transferred back from the external storage device 104 to the MFD-A 102. Such case scenarios may be implemented when the user wishes to print the job at a later time.

The MFD-A 102 includes the functionality of transferring print jobs from its print queue to an external storage device and further includes the functionality of transferring print jobs (may be the same print job or a different print job) from an external storage device (may be the same external storage device or a different external storage device) to the MFD-A 102 or MFD-B 112. Similarly, the MFD-B 112 includes the functionality of transferring print jobs from its print queue to an external storage device and further includes the functionality of transferring print jobs (may be the same print job or a different print job) from an external storage device (may be the same external storage device or a different external storage device) to the MFD-B 112 or MFD-A 102.

As would be understood by those ordinarily skilled in the art, the MFD-A 102 and the MFD-B 112 shown in FIGS. 1A, 1B and 1C are exemplary, and the systems and methods herein are equally applicable to other types of printing devices that may include fewer components or more components, without departing from the scope of the present disclosure.

Figure 2:
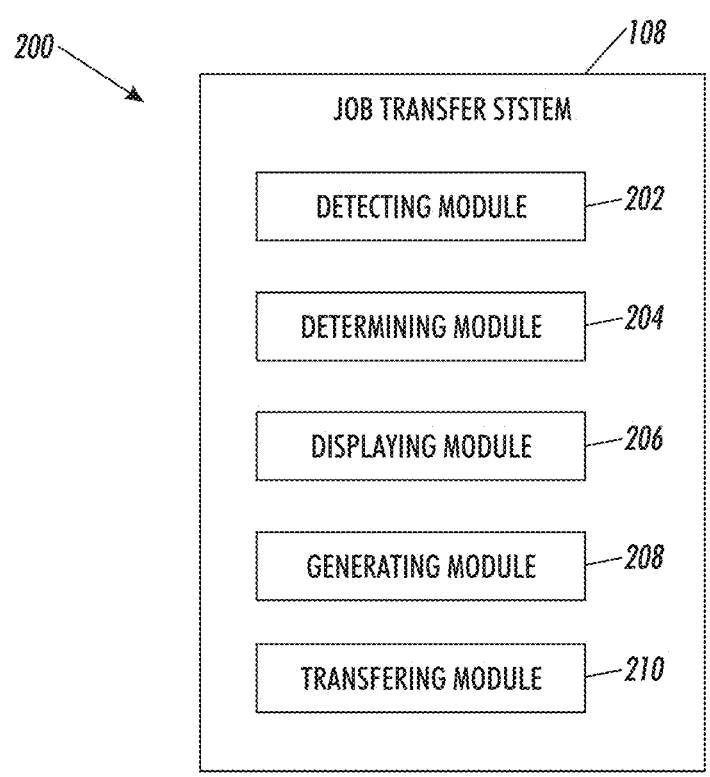
FIG. 2 illustrates a block diagram of a job transfer system, according to an example embodiment of the present disclosure.

FIG. 2 illustrates a block diagram 200 of the job transfer system 108, according to an example embodiment of the present disclosure. The job transfer system 108 can be implemented in devices, such as the MFD-A 102 and MFD-B 112, as described above in FIGS. 1A, 1B and 1C. For easy discussion, the job transfer system 108 is discussed with respect to the MFD-A 102. Reference to other figures such as FIGS. 1A-1C may be made while discussing FIG. 2. When MFD-A is referred, it is understood that MFD-A 102 is referred. Similarly, when MFD-B is referred, it is understood that MFD-B 112 is referred.

As shown, the job transfer system 108 includes a detecting module 202, a determining module 204, a displaying module 206, a generating module 208, and a transferring module 210. Each module may be in communication with each other for implementing the present disclosure. In an example embodiment, the determining module 204 may be in communication with the detecting module 202. The displaying module 206 may be in communication with the determining module 204. The generating module 208 may be in communication the displaying module 206. The transferring module 210 may be in communication with the generating module 208.

The detecting module 202 of the job transfer system 108 detects the external storage device 104 when the external storage device 104 is connected to the MFD-A 102. In an example, the user of the external storage device 104 may connect the external storage device 104 to the MFD-A 102 by plugging-in the external storage device 104 into the peripheral port 106 of the MFD-A 102. When the external storage device 104 is plugged-in into the MFD-A 102, the detecting module 202 detects the external storage device 104. As described earlier, the external storage device 104 may be a USB.

Subsequent to detection of the external storage device 104, the determining module 204 of the job transfer system 108 determines if there are one or more print jobs of the user held in the print queue of the MFD-A 102. Based on the determination of the print jobs of the user, the displaying module 206 of the job transfer system 108 displays an option to transfer the print jobs to the external storage device 104. The displaying module 206 displays the option to transfer the print jobs on the user interface of the MFD-A 102. In an example, the displaying module 206 may display an option "Transfer jobs to USB" on the user interface of the MFD-A 102. The displaying module 206 may display additional default options such as a "Print from USB" option and a "Scan to USB" option along with the "Transfer jobs to USB" option.

The displaying module 206 receives an input from the user. The input is an indicative of a selection of the option to transfer the print jobs to the external storage device 104. In an example, the input received by the displaying module 206 may be a touch input or a button input. Upon selecting the job transfer option, the displaying module 206 displays a list of the print jobs of the user on the user interface on determining more than one print job in the print queue of the multi-function device and prompts the user to select at least one print job from the displayed print jobs for transfer to the external storage device 104. The list of print jobs includes all print jobs submitted by the user but are pending for execution. The displaying module 206 then receives a selection of at least one print job for transfer to the external storage device 104 from the user. In an example, the user may select all or some of the print jobs for transfer. For simplicity, it can be considered that the user selects a single print job for transfer without limiting the scope of the disclosure.

Upon receiving the selection of a print job from the user, the generating module 208 automatically creates a pre-defined folder in the external storage device 104. In some implementations, upon receiving the selection of the print job from the user, the generating module 208 first checks if the pre-defined folder pre-exists in the external storage device 104. If the pre-defined folder does not pre-exist, then the generating module 208 creates the pre-defined folder in the external storage device 104. In all such cases, the pre-defined folder may be named as "job_transfer" or "Insta-job print." In case the pre-defined folder pre-exists in the external storage device 104, then the transferring module 210 directly transfers the selected print job into the pre-defined folder of the external storage device 104.

Once the pre-defined folder is created in the external storage device 104, the transferring module 210 of the job transfer system 108 transfers the selected print job of the user from the print queue of the MFD-A 102 to the pre-defined folder of the external storage device 104. Along with the print job, the transferring module 210 transfers job details associated with the selected print job. The job details may include a unique identification number of the print job, print job name, passcode of the print job, time to print, job attributes as originally submitted and so on.

Subsequent to transfer of the selected print job to the pre-defined folder of the external storage device 104, the transferring module 210 notifies the user of successful transfer of the print job from the MFD-A 102 to the external storage device 104. In an example, the transferring module 210 notifies the user via a pop-up message on the user interface. The transferring module 210 may pop-up a message "Job transfer to USB is successful" on the user interface.

Later when the user wishes to print the job stored in the external storage device 104, the user plugs-in the external storage device 104 into another multi-function device such as MFD-B 112. The MFD-B 112 also implements a job transfer system such as 108. The MFD-B 112 may have a different job transfer system having the same components and functionalities of transferring the job as of the job transfer system 108. But for easy discussion the job transfer system 108 is referred. The job transfer system 108 is communicatively coupled to another multi-function device MFD-B 112. The job transfer system 108 includes a detecting module 202, a determining module 204, a displaying module 206, a generating module 208, and a transferring module 210.

When the external storage device 104 is plugged-in into the MFD-B 112, the detecting module 202 detects the external storage device 104. Upon detection of the external storage device 104, the determining module 204 determines/identifies if there is any pre-defined folder including at least one print job (i.e., the print job transferred from the MFD-A 102) in the external storage device 104. If the pre-defined folder including the at least one print job is identified in the external storage device 104, the transferring module 210 transfers the at least one print job along with the job details from the external storage device 104 to a print queue of the MFD-B 112. In this way, the transferring module 210 automatically populates the print queue of the MFD-B 112 with the at least one print job and the job details, for printing.

Based on the name of pre-defined folder, the at least one print job in the pre-defined folder is added to the print queue of the MFD-B 112. In case the pre-defined folder is named as an "job_transfer" folder, then the at least one print job stored in the "job_transfer" folder is transferred to a next available slot of the print queue of the MFD-B 112. In case the pre-defined folder is named as an "Insta-job print" folder, then the at least one print job stored in the "Insta-job print" folder is transferred to top of the print queue of the MFD-B 112 such that the at least one print job is instantly printed on priority basis.

Subsequent to transfer of the at least one print job to the print queue of the MFD-B 112, the transferring module 210 notifies the user of successful transfer of the at least one print job from the external storage device 104 to the MFD-B 112. In an example, the transferring module 210 notifies the user via a pop-up message "Job transfer to Multi-function device is successful."

Once the at least one print job is transferred from the external storage device 104 to the print queue of the MFD-B 112, the at least one print job is successfully printed by MFD-B 112. In case the print job is a secure print job, the user may enter passcode to print job. In an example, if two print jobs are transferred to the MFD-B 112, such that "Time to print" the first job is 5:00 PM and "Time to print" the second job is 5:15 PM, the MFD-B 112 prints these two print jobs as per the schedule.

The job transfer system 108 may be communicatively coupled to the devices, MFD-A 102 and MFD-B 112.

As discussed above, the job transfer system 108 implements the functionality related to job transfer. But in some implementations, the functionalities of the job transfer system 108 can be directly incorporated into the MFD-A 102 and MFD-B 112. In such implementations, the MFD-A 102 and MFD-B 112 performs the job transfer function as detailed above and discussed below.

Figure 3A:
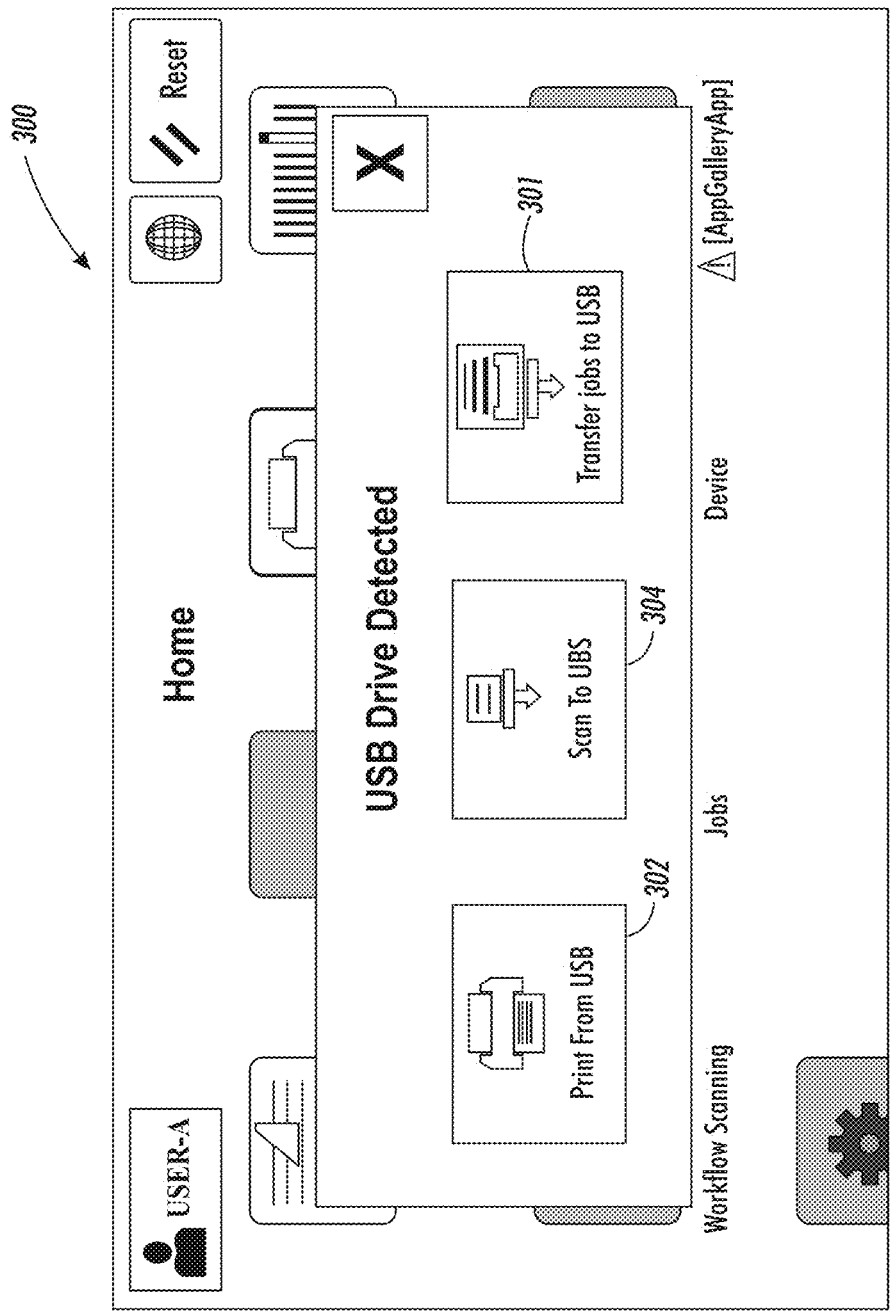
FIGS. 3A and 3B illustrate exemplary snapshots of a user interface of a multi-functional device, according to an example embodiment of the present disclosure.
Figure 3B:
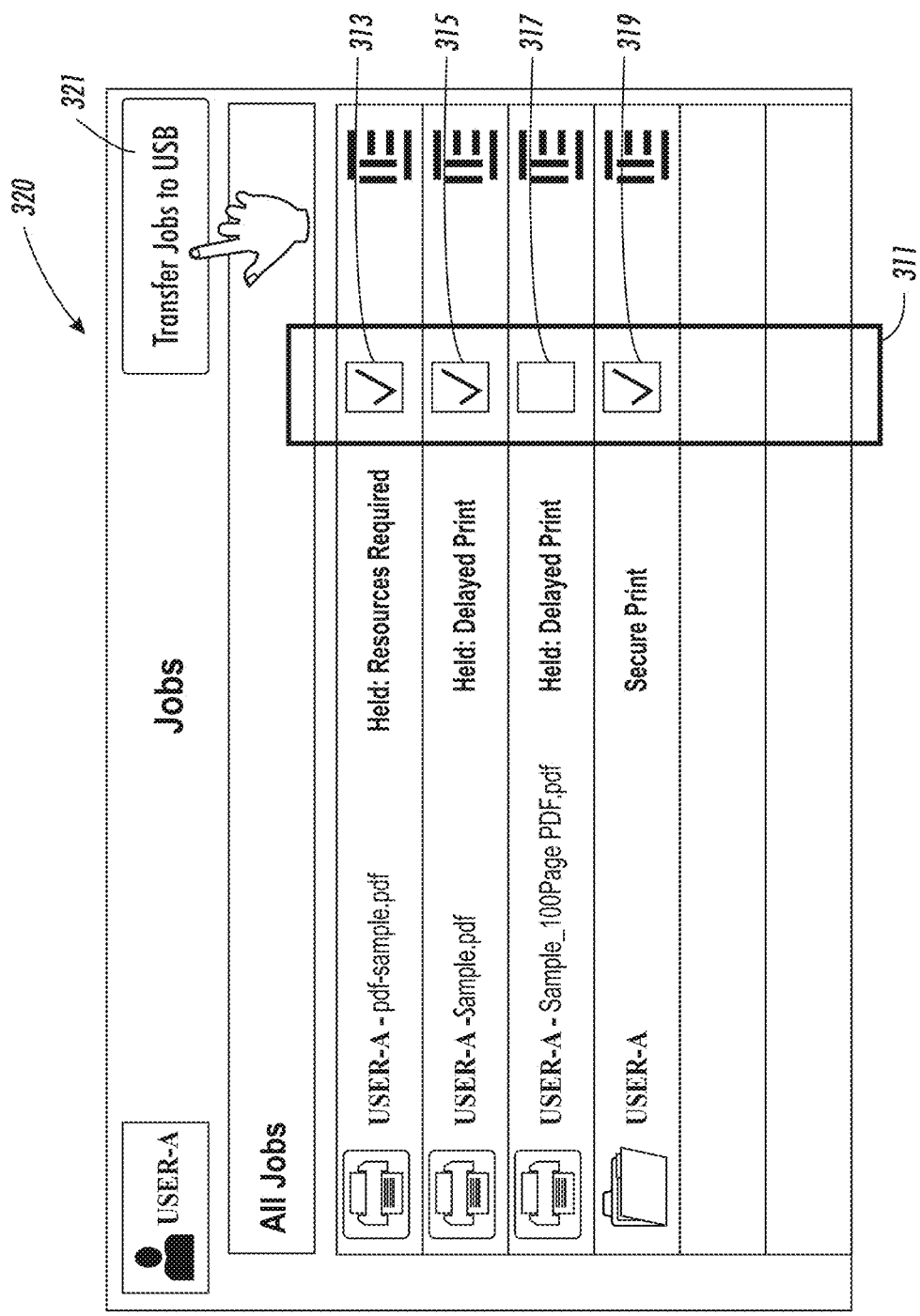

FIGS. 3A and 3B illustrate exemplary snapshots 300, 320 of a user interface of a multi-function device such as MFD-A 102, according to an example embodiment of the present disclosure.

As can be seen in the snapshot 300, the MFD-A 102 displays the "Transfer jobs to USB" option marked as 301 along with "Print from USB" 302 and "Scan to USB" 304 options on its user interface. In an example embodiment, when a user inserts a USB into the MFD-A 102, the MFD-A 102 checks its print queue and finds that print jobs of the user are existing or pending in the print queue. The job transfer option is displayed to the user via the user interface only when any pending job corresponding to the user is found in the print queue of the MFD-A 102.

In the snapshot 320 of FIG. 3B, a list of print jobs is displayed to the user via the user interface. The list 311 shows jobs such as 313, 315, 317, and 319 that are present/pending in the print queue of the MFD-A 102. The snapshot 320 further shows one or more jobs such as 313, 315, and 319 selected by the user (using check box) for transfer. After the jobs 313, 315 and 319 are selected by the user, the user selects the "Transfer jobs to USB" option 321 for transfer as shown in the snapshot 320.

Figure 4A:
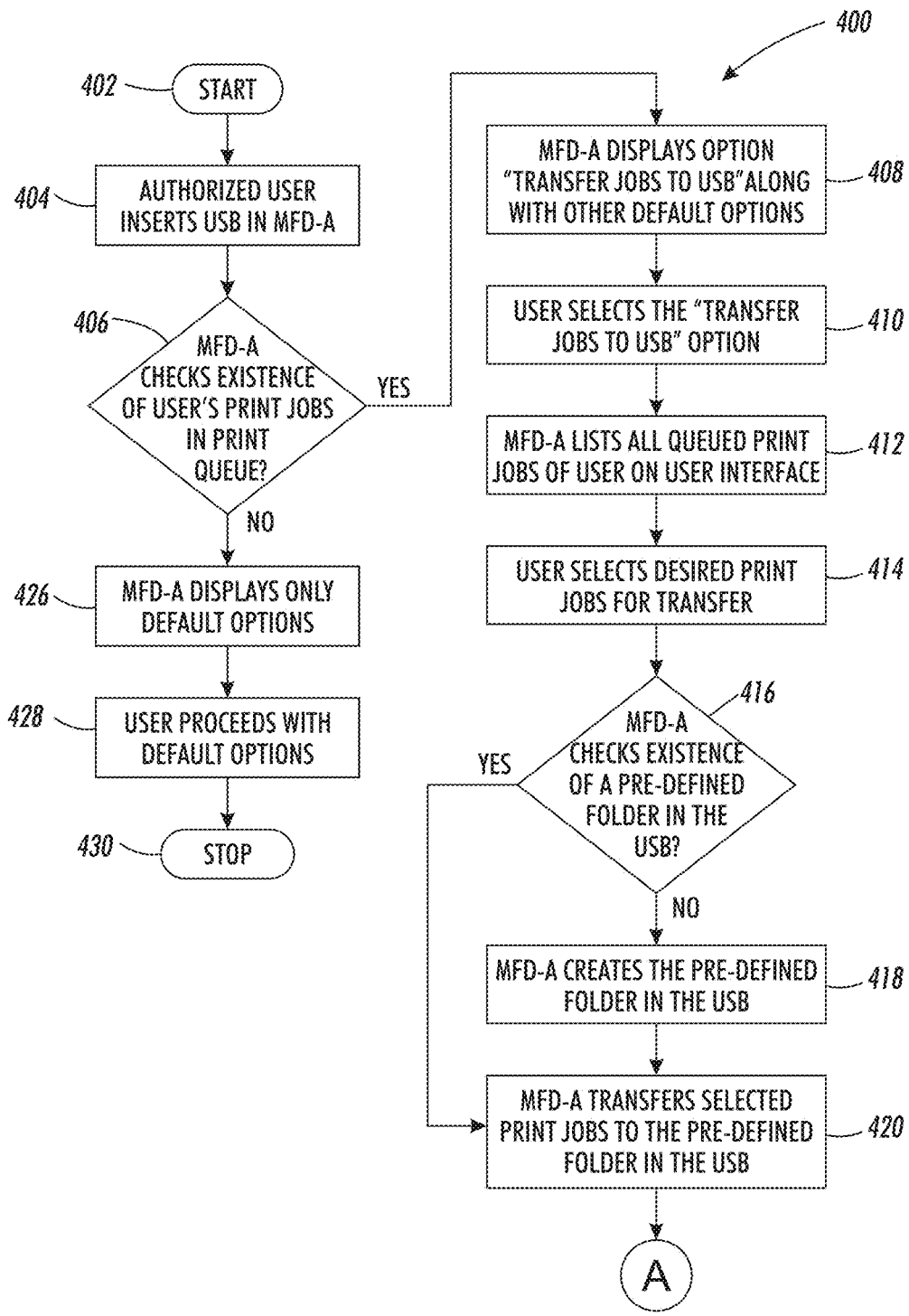
FIGS. 4A and 4B illustrate an exemplary process for transferring print jobs from the multi-function device to an external storage device, according to an example embodiment of the present disclosure.
Figure 4B:
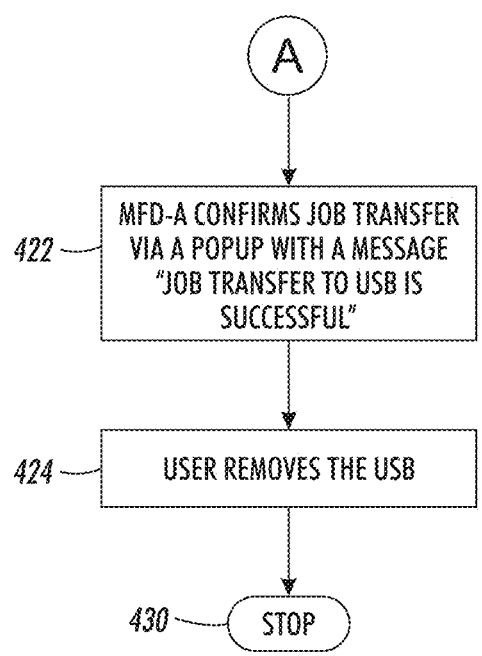

FIGS. 4A-4B illustrate an exemplary process 400 for transferring of print jobs from the MFD-A 102 to the external storage device 104, according to an example embodiment of the present disclosure. The process 400 is implemented when a user wishes to transfer his print job from the MFD-A 102 to the external storage device 104. Reference to other figures such as FIGS. 1A-1C may be made while discussing FIGS. 4A-4B.

As can be seen in FIGS. 4A and 4B, the process 400 commences at block 402. Before implementing the block 404, the user logs-in into the MFD-A 102. The user provides his user name and/or password to the MFD-A 102. The MFD-A 102 checks whether the login credentials of the user are correct and based on the check, the MFD-A 102 allows the user to continue further. If the login credentials are correct, the user is logged-in as an authorized user.

At block 404, the authorized user inserts the external storage device 104, such as a Universal Serial Bus (USB) device into the MFD-A 102. At block 406, the MFD-A 102 checks for existence of one or more print jobs of the user in its print queue. If the one or more print jobs of the user exist in the print queue of the MFD-A 102, then at block 408, the MFD-A 102 displays an option "Transfer jobs to USB" along with the other default options on the user interface. At block 410, the user selects the "Transfer jobs to USB" option. Then at block 412, the MFD-A 102 lists all queued print jobs of the user on the user interface for selection. Thereafter, at block 414, the user selects a print job from the displayed print jobs for transfer from the MFD-A 102 to the USB. On receiving the user selection, at block 416, the MFD-A 102 checks for existence of a pre-defined folder named, for example, "Insta-job transfer" folder in the USB. If the folder named "Insta-job transfer" does not exist in the USB, then at block 418, the MFD-A 102 first automatically creates the pre-defined folder, "Insta-job transfer" folder in the USB. Furthermore, at block 420, the MFD-A 102 transfers all the print jobs selected by the user to the pre-defined folder, "Insta-job transfer" folder. At block 422, the MFD-A 102 confirms job transfer to the user via a popup with a message "Job transfer to USB is successful." Further, at block 424, the user removes the USB from the MFD-A 102.

Looping back to the condition at 406, if print jobs of the user do not exist in the print queue of the MFD-A 102, then the process 400 straightaway moves to block 426. At the block 426, the MFD-A 102 displays only default options to the user on its user interface. The default options, for example, may include a "Print from USB" option and a "Scan to USB option." Then at block, 428, the user proceeds with default options. For example, the user may proceed with "Scan to USB option." The process 400 then stops at block 430.

Figure 5:
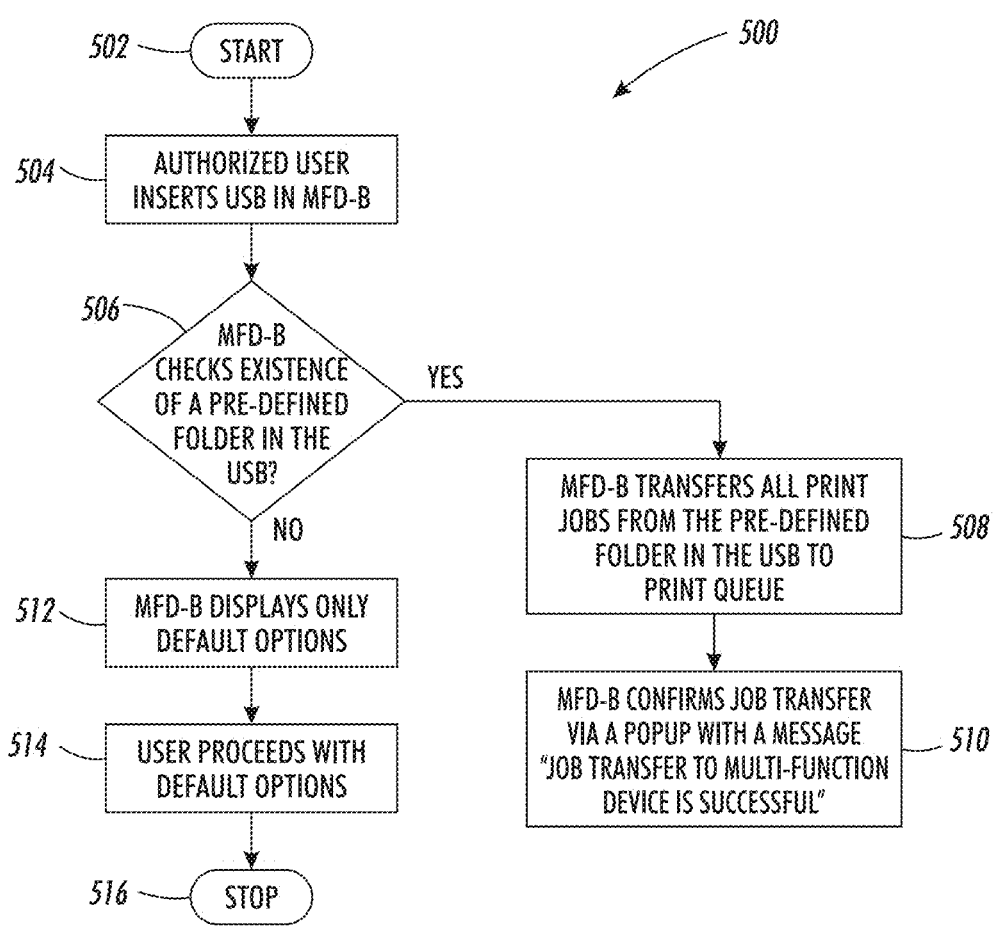
FIG. 5 illustrates an exemplary process for transferring of print jobs from the external storage device to another multi-function device, according to an example embodiment of the present disclosure.

FIG. 5 illustrates an exemplary process 500 for transferring of print jobs from the external storage device 104 to the MFD-B 112, according to an example embodiment of the present disclosure. The process 500 is implemented when the user wishes to transfer his print job from the external storage device 104 to the MFD-B 112, for printing at the MFD-B 112. Reference to other figures such as FIGS. 1A-1C may be made while discussing FIG. 5.

As can be seen in FIG. 5, the process 500 commences at block 502. Before implementing the block 504, the user logs-in into the MFD-B 112. The user provides his user name and/or password to the MFD-B 112. The MFD-B 112 checks whether the login credentials of the user are correct and based on the check, the MFD-B 112 allows the user to continue further. If the login credentials are correct, the user is logged-in as an authorized user.

At block 504, the authorized user inserts the external storage device 104, such as a USB device into the MFD-B 112. Further, at block 506, the MFD-B 112 checks for existence of a pre-defined folder named such as "Insta-job transfer" folder inside the USB. If the folder named "Insta-job transfer" exists in the USB, then at block 508, the MFD-B 112 transfers all the print jobs stored in the "Insta-job transfer" folder in the USB to its print queue. At block 510, the MFD-B 112 confirms job transfer to the user via a popup with a message "Job transfer to Multi-function device is successful."

Looping back to the condition at 506, if there is no pre-defined folder in the USB, the MFD-B 112 moves to block 512. At block 512, the MFD-B 112 displays default options to the user on its user interface, and then moves to the block 514 where the user proceeds with default options. The process 500 finally stops at block 516.

Figure 6:
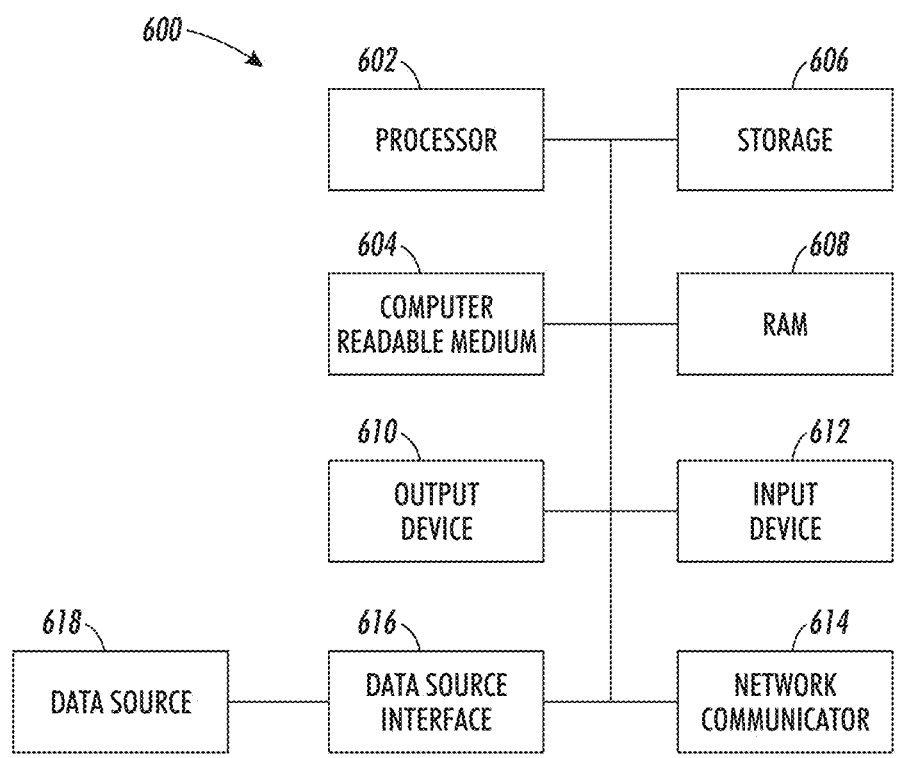
FIG. 6 illustrates a hardware platform for implementation of the multi-function device, according to an example embodiment of the present disclosure.

FIG. 6 illustrates a hardware platform 600 for implementation of the multi-function device, according to an example of the present disclosure. In an example embodiment, the hardware platform 600 may be a computer system 600 that may be used with the examples described herein. The computer system 600 may represent a computational platform that includes components that may be in a server or another computer system. The computer system 600 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 600 may include a processor 602 that executes software instructions or code stored on a non-transitory computer readable storage medium 604 to perform methods of the present disclosure. The software code includes, for example, instructions to transfer print jobs from an external storage device to a multi-function device, and from another multi-function device to the external storage device. In an embodiment, the job transfer system 108 is a software code or a component implementing the above blocks.

The instructions on the computer readable storage medium 604 are read and stored the instructions in storage 606 or in random access memory (RAM) 608. The storage 606 provides a large space for keeping static data where at least some instructions could be stored for later execution. The stored instructions may be further compiled to generate other representations of the instructions and dynamically stored in the RAM 608. The processor 602 reads instructions from the RAM 608 and performs actions as instructed.

The computer system 600 further includes an output device 610 to provide at least some of the results of the execution as output including, but not limited to, visual information to users. The output device 610 can include a display on computing devices. For example, the display can be a mobile phone screen or a laptop screen. GUIs and/or text are presented as an output on the display screen. The computer system 600 further includes input device 612 to provide a user or another device with mechanisms for entering data and/or otherwise interact with the computer system 600. The input device may include, for example, a keyboard, a keypad, a mouse, or a touchscreen. In an embodiment, an option to transfer the print jobs to the external storage device and notifications for successful transfer of the print jobs are displayed on the output device 610. Each of these output devices 610 and input devices 612 could be joined by one or more additional peripherals.

A network communicator 614 may be provided to connect the computer system 600 to a network and in turn to other devices connected to the network including other clients, servers, data stores, and interfaces, for instance. A network communicator 614 may include, for example, a network adapter such as a LAN adapter or a wireless adapter. The computer system 614 includes a data source interface 616 to access data source 618. A data source is an information resource. As an example, a database of exceptions and rules may be a data source. Furthermore, knowledge repositories and curated data may be other examples of data sources.

Figure 7A:
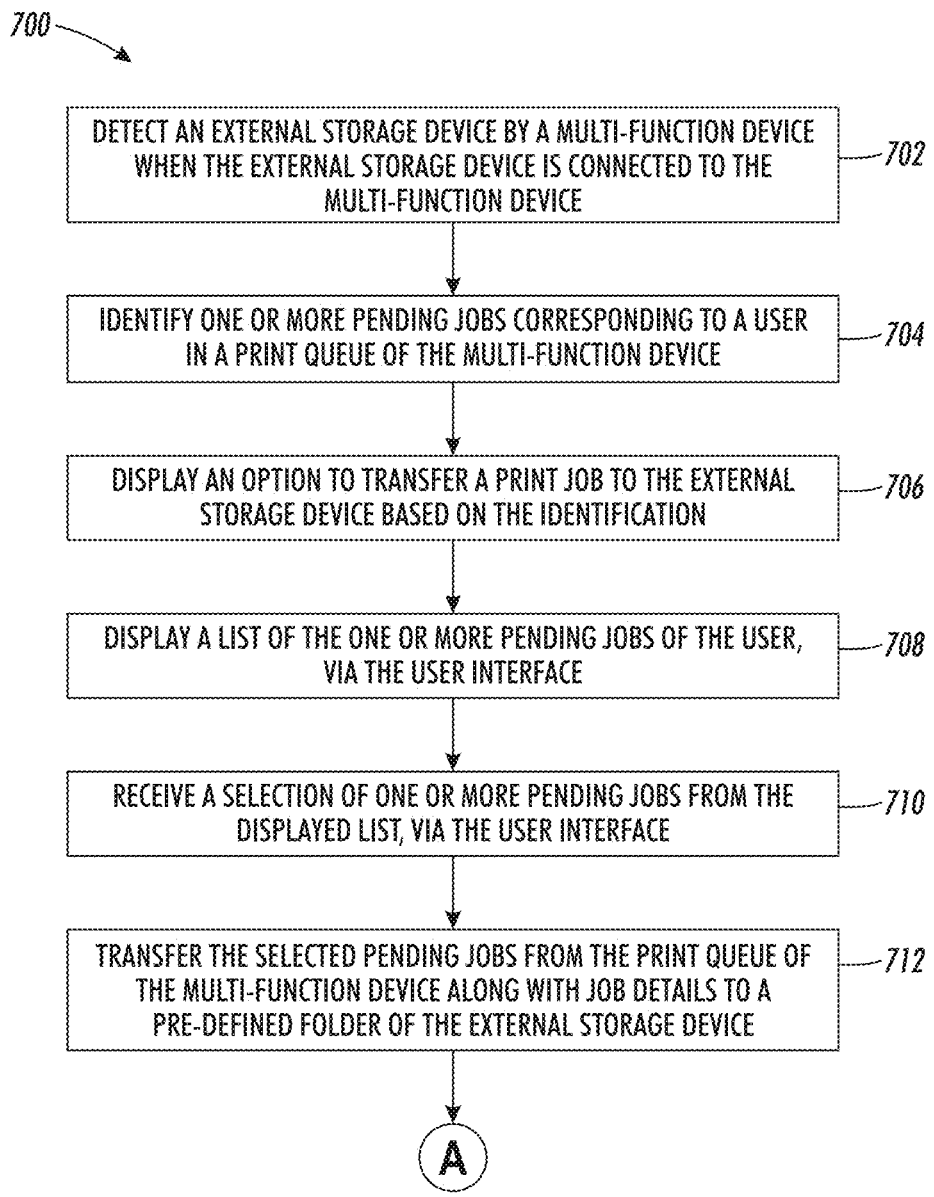
FIGS. 7A and 7B illustrate a detailed method for transferring print jobs from one device to another device, according to an example embodiment of the present disclosure.
Figure 7B:
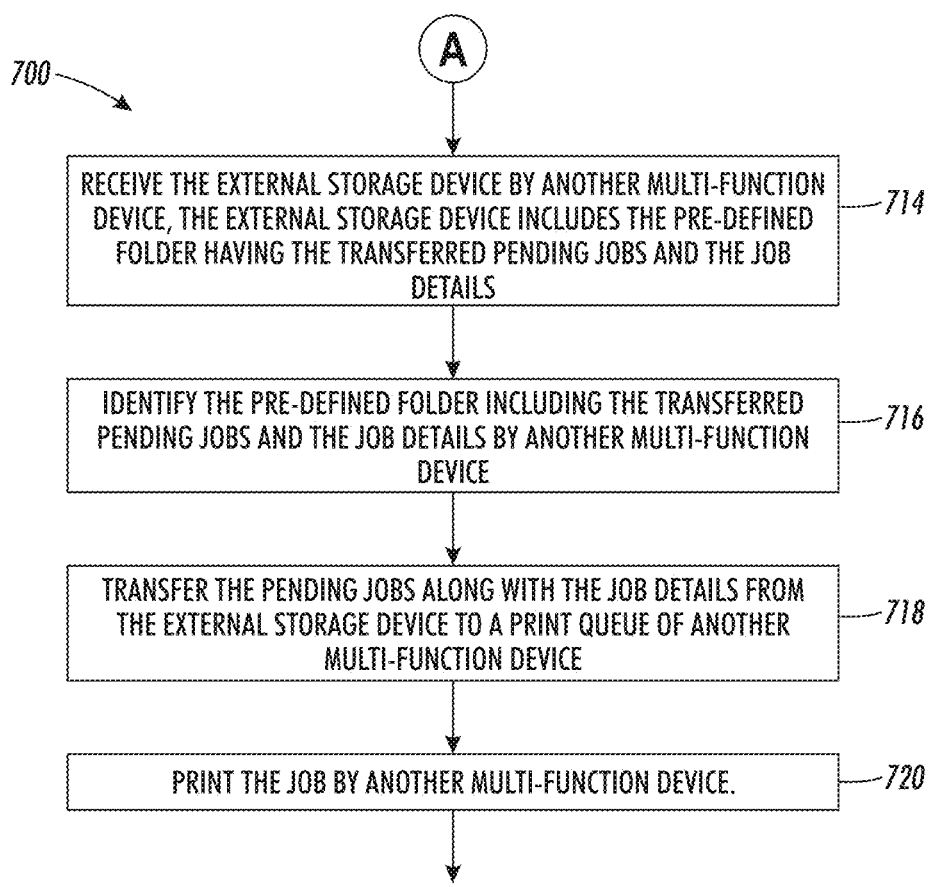

FIGS. 7A-7B illustrate a complete method 700 for transferring print jobs from one multi-function to another multi-function device, according to an example embodiment of the present disclosure. The print jobs are transferred only when a user provides his input, for example, selection of the job transfer option and/or selection of one or more print jobs to be transferred. The method outlines when the user transfers his print jobs from the multi-function device (such as MFD-A 102) to an external storage device (104) and then transfers the stored print job from the external storage device (104) to another multi-function device (MFD-B 112) for printing. Reference to other figures such as FIGS. 1A-1C may be made while discussing FIGS. 7A and 7B. When MFD-A is referred, it is understood that MFD-A 102 is referred. Similarly, when MFD-B is referred, it is understood that MFD-B 112 is referred.

To begin with, the user logs-in into the multi-function device using username and/or password. The multi-function device authenticates the user based on the username and/or password and then allows the user to login as an authorized user. While authenticating, the multi-function device checks whether the user is a privileged user. To check this, the multi-function device checks the user credentials with a pre-defined list of privileged users. If the user credentials are found in the list, the user is considered as a privileged user. Else, the user is logged-in as an authorized user.

Upon successful login, the user connects the external storage device to the multi-function device. The external storage device is connected to the multi-function device via a peripheral port such as a USB port. The external storage device is received by the multi-function device. In an example, the authorized user may be understood as a user who is registered and has access to the multi-function device. Before connecting the external storage device to the multi-function device, the user requires to login to the multi-function device using his credentials such as a username and a password. In some implementations, the user requires to login to the multi-function device after connecting the external storage device to the multi-function device.

Referring to FIGS. 7A and 7B, at block 702, the external storage device is detected by the multi-function device when the external storage device is connected to the multi-function device. In an example, the detecting module 202 of the job transfer system 108 may detect the external storage device when the external storage device is connected to the multi-function device.

At block 704, one or more pending jobs corresponding to the user in a print queue of the multi-function device are identified, when the user connects the external storage device to the multi-function device. In an example, the determining module 204 of the job transfer system 108 may identify if the user has any pending print job in its print queue.

At block 706, based on the identification of the one or more pending jobs, an option such as a job transfer option to transfer the print job to the external storage device is displayed. The job transfer option is displayed only when the user has any pending job in the print queue of the multi-function device. The option to transfer the print job to the external storage device is displayed on a user interface of the multi-function device. In an example, the displaying module 206 of the job transfer system 108 may display the option to transfer the print job to the external storage device based on the identification of the one or more pending jobs. In cases the user has no pending jobs in the print queue, the method stops.

At 708, a list of one or more pending jobs of the user is displayed via the user interface. In an example, the displaying module 206 of the job transfer system 108 may display the list. At block 710, a selection of one or more pending jobs from the displayed list, is received. The print jobs which the user wishes to transfer from the multi-function device are selected or input via the user interface. In an example, the selection is received on the user interface and the input received from the user may be a touch input or a button input. In an example, the displaying module 206 of the job transfer system 108 may receive the selection of the one or more pending jobs.

Upon selection of the pending jobs, at block 712, the selected pending jobs are transferred from the print queue of the multi-function device along with job details to a pre-defined folder of the external storage device. In an example, the transferring module 210 may transfer the selected jobs to the external storage device. Before transferring the selected print jobs, the pre-defined folder is created in the external storage device. In an example, the generating module 208 of the job transfer system 108 may automatically create a pre-defined folder in the external storage device. The pre-defined folder may be created based on the type of the user. In case the user is an authorized user, the pre-defined folder is created with a name such as such as "job_transfer." In case the user is a privileged user, the pre-defined folder is created with a name such as "Inst-print job." The folder name indicates that the jobs inside the pre-defined folder belongs to the privileged user and thus, needs to be prioritized. The phrase "inst" indicates instant printing is required and is possible only in case of privileged users. In case the user is recognized as a privileged user, the user may create the pre-defined folder as required. Further, the privileged user may change the name of the pre-defined folder if created by the generation module 208. Before creating the pre-defined folder, it is checked whether there is any pre-defined folder pre-existing in the external storage device. In cases the external storage device has the pre-defined folder, the method directly transfers the selected print jobs to the pre-defined folder in the external storage device. In this manner, the selected print jobs are transferred from the print queue of the multi-function device to the external storage device along with the job details.

The job details may include a unique identification number of the print job, print job name, passcode of the print job, time to print, job attributes, and the like. The job and the job details are stored in a pre-defined format such as JDF. In one example, the job and job details are stored such that the job and the job details are readable by the multi-function device. In another example, the job and the job details are stored such that the job and the job details are readable by the user.

Post transferring the print job from the multi-function device to the external storage device, the method proceeds further when the selected print jobs are transferred from the external storage device to another multi-function device. The user plugs-in the external storage device into another multi-function device. Upon plugging-in, the user logs-in into another multi-function device as an authorized user. The login procedure and the user determination procedure is same as mentioned above.

After login, at 714, another multi-function device receives and detects the external storage device as plugged-in by the user. The external storage device includes the pre-defined folder having the transferred pending jobs and the job details. At 716, the pre-defined folder including the transferred pending jobs and the job details are identified by another multi-function device. At 718, the pending jobs and the job details are transferred/loaded from the external storage device to a print queue of another multi-function device.

The pending print jobs are transferred based on the pre-defined folder. For example, the print jobs are transferred based on the name of the pre-defined folder. If the name of the print job is "job_transfer," the print job is added to a next slot as available in the print queue of another multi-function device. If the name of the print job is "inst-print," then the print job is added to top of the print queue of another multi-function device.

The print job is finally transferred from the external storage device to the print queue of another multi-function device. Once added, the print job is printed in accordance with the job details at 720. In this manner, the user can easily transfer the print jobs from one multi-function device to another multi-function device via the external storage device.

The methods 400, 500 and 700 can be implemented in the form of a non-transitory computer-readable medium including instructions executable by a processing resource. For example, the method of transferring the print job from the MFD-A 102 to the external storage device 104 can be implemented in the form of a non-transitory computer-readable medium. Similarly, the method of transferring the print job from the external storage device 104 to the MFD-B 112 can be implemented in the form of a non-transitory computer-readable medium.

Exemplary Case Scenarios

For better understanding of the disclosure, exemplary case scenarios are discussed. In one example, it is considered that a user submits three secure jobs (job A, job B and job C) to a multi-function device, i.e., MFD-A from his computing device. The user then reaches nearby MFD-A and logs into the MFD-A as an authorized user. The user then prints sample documents for testing purpose and finds that the image quality is not good on printed sample documents. As a result, the user decides to print the job in another multi-function device, i.e., MFD-B. The user then plugs-in his external storage device such as a pen drive into the MFD-A. The MFD-A then checks its job queue and finds that the user's jobs are existing in the job queue. The MFD-A then prompts the user with an option "transfer to USB" along with other options such as "print from" and "scan to" USB options. The user then selects the "transfer to USB" option. The MFD-A lists all three secure jobs of the user on the user interface. The user selects job B ad job C and provides his confirmation through the user interface. After receiving the confirmation, the MFD-A automatically creates a folder such as Insta_job_transfer inside the USB and transfers the selected job B and job C to the USB along with job details. Post transferring, the MFD-A displays a message "Job transfer to USB is successful, please remove the USB." The user then removes the USB from the MFD-A. The user logs-in into MFD-B as an authorized user and plugs-in the USB into the MFD-B. The MFD-B checks and finds the Insta_job_transfer stored in the USB. Once the MFD-B finds the folder, the MFD-B transfers all the print jobs existing in the folder along with respective job details from the USB to its print queue. Once jobs are moved to MFD-B's job queue, the user enters the respective passcode and releases the secured jobs. Finally, the secured jobs B and job C are printed successfully at MFD-B.

In another example, a user submits 2 delayed jobs to MFD-A (say job submitted time is 11:00 AM and "Time to Print" the first job is 01:00 PM and for second job is 01:15 PM). The user comes nearby to the MFD-A by 12:00 PM and finds the MFD-A is in fuser failure state and it needs a service call. As a result, the user decides to print the job in another multi-function device, i.e., MFD-B. The user then plugs-in his external storage device such as a pen drive into the MFD-A. The MFD-A then checks its job queue and finds that the user's jobs are existing in the job queue. The MFD-A then prompts the user with an option "transfer to USB" along with other options such as "print from" and "scan to" USB options. The user then selects the "transfer to USB" option. The MFD-A lists all the jobs of the user. The user selects all jobs and provides his confirmation through the user interface. After receiving the confirmation, the MFD-A automatically creates a folder such as Instajob_transfer inside the USB and transfers the selected job B and job C to the USB along with job details. Post transferring, the MFD-A displays a message "Job transfer to USB is successful, please remove the USB." The user then removes the USB. The user logs-in into MFD-B as an authorized user and plugs-in into the USB. The MFD-B checks and finds the Instajob_transfer stored in the USB. Once the MFD-B finds the folder, the MFD-B retrieves the print jobs and transfers all the print jobs existing in the folder along with respective job details from the USB to its print queue. In the MFD-B, first job gets printed successfully by 01:00 PM and second job by 01:15 PM (as per the initial schedule).

The present disclosure discloses methods and systems for transferring print jobs from one multi-function device to another multi-function device via an external storage device (as opposed to network). Thereby alleviating the need for a network connection between the multi-function devices. The print jobs and corresponding job details are transferred as a single package for easy retrieval. The methods and systems allow only authorized users to transfer/move their print jobs out of a print queue of the multi-function device. The systems and methods further allow authorized users to instantly transfer print jobs to a different multi-function device if, for example, the originally targeted multi-function device has malfunctioned, or is currently busy printing other print jobs, without having a need to reconfigure the print jobs. The methods and systems preserve original jobs' attributes, security, print scheduling, etc. The print jobs are transferred only based on user's preferences/input. The methods and systems transfer print jobs with minimal input from the user, thereby reduces time and effort required by the user. Additionally, the implementation of the disclosure does not require any hardware changes to existing devices and/or systems.

The present disclosure is implemented for case scenarios where a user submits a print job, but execution of the print job is not started and finally the user wishes to remove the print job from a print queue of a multi-function device due to various reasons. Hence, the disclosure provides a way for the user to clean up his queue in the current device and convert his jobs into instantly transferable jobs (rather than having to reconfigure them).

For a person skilled in the art, it is understood that the use of phrase(s) "is," "are," "may," "can," "could," "will," "should," or the like, is for understanding various embodiments of the present disclosure and the phrases do not limit the disclosure or its implementation in any manner.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "detecting," or "determining," or "displaying," or "receiving," or "generating," "or transferring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and other.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for transferring print jobs from a multi-function device to an external storage device, the method comprising:
    detecting the external storage device by the multi-function device when the external storage device is connected to the multi-function device;
    determining if there is a print job of a user in a print queue of the multi-function device, wherein the print job is a job pending for execution in the print queue of the multi-function device;
    displaying at least one default option, via a user interface of the multi-function device, when no print job of the user is pending in the print queue of the multi-function device, the at least one default option including a print from external storage device option;
    displaying a job transfer option, via the user interface, to transfer the print job from the print queue of the multi-function device to the external storage device based on the determination of the print job of the user in the print queue of the multi-function device;
    receiving an input from the user, wherein the input is indicative of a selection of the option to transfer the print job to the external storage device;
    providing a list of at least one queued print job on the user interface of the multi-function device;
    receiving a selection on the user interface of at least one queued print job from the list. creating, by the multi-function device, a pre-defined folder in the external storage device based on receiving the input; and
    transferring, by the multi-function device, the selected queued print job of the user from the print queue of the multi-function device to the pre-defined folder of the external storage device.

2. The method as claimed in claim 1, further comprising prompting the user to select at least one print job from the displayed list of at least one queued print job for transfer to the external storage device.

3. The method as claimed in claim 1, further comprising transferring job details associated with the selected queued print job to the pre-defined folder of the external storage device.

4. The method as claimed in claim 1, wherein the user is an authorized user.

5. The method as claimed in claim 1, further comprising:
    determining if the pre-defined folder pre-exists in the external storage device; and
    based on the determination, automatically creating the pre-defined folder in the external storage device.

6. The method as claimed in claim 1, further comprising receiving the external storage device storing the selected queued print job and job details, by a different multi-function device.

7. The method as claimed in claim 6, further comprising automatically loading the selected queued print job and the job details from the external storage device, into a print queue of the different multi-function device, when the external storage device is connected to the different multi-function device.

8. The method as claimed in claim 6, further comprising identifying the pre-defined folder present in the external storage device when the external storage device is connected to the different multi-function device.

9. The method as claimed in claim 6, further comprising printing the selected queued print job in accordance with the job details, by the different multi-function device.

10. A method for transferring one or more print jobs from a multi-function device to a different multi-function device via an external storage device, the method comprising:
    detecting the external storage device by the multi-function device when the external storage device is connected to the multi-function device;
    determining if there is a print job of a user in a print queue of the multi-function device, wherein the print job is a job pending for execution in the print queue of the multi-function device;
    displaying at least one default option, via a user interface of the multi-function device, when no print job of the user is pending in the print queue of the multi-function device, the at least one default option including a print from external storage device option;
    displaying a job transfer option, via the user interface, upon identifying one or more pending jobs for execution corresponding to the user in the print queue of the multi-function device when the user connects the external storage device to the multi-function device, the job transfer option to transfer the one or more pending jobs from the print queue of the multi-function device to the external storage device based on the identification of the one or more pending jobs;

displaying a list of the one or more pending jobs of the user, via the user interface;

receiving a selection of one or more pending jobs from the displayed list, via the user interface;

transferring, by the multi-function device, the selected pending jobs from the print queue of the multi-function device along with job details to a pre-defined folder of the external storage device, wherein the pre-defined folder is created by the multi-function device based on receiving the selection;

receiving the external storage device by the different multi-function device, the external storage device comprising the pre-defined folder having the transferred pending jobs and the job details;

identifying the pre-defined folder comprising the transferred pending jobs and the job details by the different multi-function device;

transferring the pending jobs along with the job details from the external storage device to a print queue of the different multi-function device; and printing the job by the different multi-function device according to the job details.

11. The method as claimed in claim 10, wherein the user is an authorized user.

12. The method as claimed in claim 10, further comprising adding the pending jobs along with the job details to the print queue of the different multi-function device, based on the pre-defined folder in the external storage device.

13. A job transfer system for transferring print jobs from a multi-function device to an external storage device, the job transfer system comprising one or more processors to:
   detect the external storage device when the external storage device is connected to the multi-function device;
   determine if there is a print job of a user in a print queue of the multi-function device, wherein the print job is a job pending for execution in the print queue of the multi-function device;
   display at least one default option, via a user interface of the multi-function device, when no print job of the user is pending in the print queue of the multi-function device, the at least one default option including a print from external storage device option;
   display a job transfer option to transfer the print job from the print queue of the multi-function device to the external storage device based on the determination of the print job of the user in the print queue of the multi-function device;
   receive an input from the user, wherein the input is indicative of a selection of the job transfer option to transfer the print job to the external storage device;
   provide a list of at least one queued print job on the user interface of the multi-function device;
   receive a selection on the user interface of at least one queued print job from the list;
   create, by the job transfer system, a pre-defined folder in the external storage device based on receiving the input; and
   transfer, by the job transfer system, the selected queued print job of the user from the print queue of the multi-function device into the pre-defined folder of the external storage device, along with job details.

14. The job transfer system as claimed in claim 13, wherein the one or more processors further:
   determines if the pre-defined folder pre-exists in the external storage device; and
   based on the determination, creates the pre-defined folder in the external storage device.

15. The job transfer system as claimed in claim 13, wherein the one or more processors further notifies the user of successful transfer of the selected queued print job from the multi-function device to the external storage device.

16. The job transfer system as claimed in claim 13, is communicatively coupled to a different multi-function device, wherein the different multi-function device is to receive the external storage device comprising the selected queued print job and the job details.

17. The job transfer system as claimed in claim 16, wherein the different multi-function device is to load the selected queued print job and the job details from the external storage device, into a print queue of the different multi-function device when the external storage device is connected to the different multi-function device.

18. The job transfer system as claimed in claim 16, wherein the different multi-function device is to identify the pre-defined folder present in the external storage device when the external storage device is connected to the different multi-function device.

19. A multi-function device, comprising:
   a peripheral port to receive an external storage device;
   a job transfer system in communication with the peripheral port, the job transfer system comprising one or more processors to:
   detect the external storage device when the external storage device is connected to the multi-function device;
   determine if there is a print job of a user in a print queue of the multi-function device, wherein the print job is a job pending for execution in the print queue of the multi-function device;
   display at least one default option, via a user interface of the multi-function device, when no print job of the user is pending in the print queue of the multi-function device, the at least one default option including a print from external storage device option;
   display a job transfer option to transfer the print job from the print queue of the multi-function device to the external storage device based on the determination of the print job of the user in the print queue of the multi-function device; and
   receive an input from the user, wherein the input is indicative of a selection of the job transfer option to transfer the print job to the external storage device;
   provide a list of at least one queued print job on the user interface of the multi-function device;
   receive a selection on the user interface of at least one queued print job from the list;
   create, by the multi-function device, a pre-defined folder in the external storage device based on receiving the input; and
   transfer, by the multi-function device, the selected queued print job of the user, from the print queue of the multi-function device into the pre-defined folder of the external storage device.

20. The multi-function device as claimed in claim 19, wherein the one or more processors further
   prompts the user to select at least one print job from the displayed print jobs to transfer to the external storage device.

21. The multi-function device as claimed in claim 19, wherein the one or more processors further transfers job details associated with the print job to the pre-defined folder of the external storage device.

22. A non-transitory computer-readable medium comprising instructions executable by a processing resource to:
  detect an external storage device by a multi-function device when the external storage device is connected to the multi-function device;
  determine if there is a print job of a user in a print queue of the multi-function device, wherein the print job is a job pending for execution in the print queue of the multi-function device;
  display at least one default option, via a user interface of the multi-function device, when no print job of the user is pending in the print queue of the multi-function device, the at least one default option including a print from external storage device option;
  display an option to transfer the print job from the print queue of the multi-function device to the external storage device based on the determination of the print job of the user in the print queue of the multi-function device;
  receive an input from the user, wherein the input is indicative of a selection of the option to transfer the print job to the external storage device;
  provide a list of at least one queued print job on the user interface of the multi-function device;
  receive a selection on the user interface of at least one queued print job from the list;
  automatically create a pre-defined folder in the external storage device based on receiving the input; and
  transfer the selected queued print job of the user from the print queue of the multi-function device into the pre-defined folder of the external storage device.

23. The non-transitory computer-readable medium as claimed in claim 22 comprising instructions executable by the processing resource to:
  determine if the pre-defined folder pre-exists in the external storage device; and
  automatically create the pre-defined folder in the external storage device if the pre-defined folder does not pre-exist.

24. The non-transitory computer-readable medium as claimed in claim 22 comprising instructions executable by the processing resource to transfer job details associated with the selected queued print job into the pre-defined folder of the external storage device.

25. The non-transitory computer-readable medium as claimed in claim 22 comprising instructions executable by the processing resource to receive the external storage device storing the print job and job details, by a different another multi-function device.

26. The non-transitory computer-readable medium as claimed in claim 22 comprising instructions executable by the processing resource to automatically load the selected queued print job and job details from the external storage device, into a print queue of a different multi-function device, when the external storage device is connected to the different multi-function device.

27. The non-transitory computer-readable medium as claimed in claim 22 comprising instructions executable by the processing resource to identify the pre-defined folder present in the external storage device when the external storage device is connected to a different multi-function device.

28. A system comprising:
  a multi-function device to:
  detect an external storage device when the external storage device is connected to the multi-function device;
  determine if there is a print job of a user in a print queue of the multi-function device, wherein the print job is a job pending for execution in the print queue of the multi-function device;
  display at least one default option, via a user interface of the multi-function device, when no print job of the user is pending in the print queue of the multi-function device, the at least one default option including a print from external storage device option;
  display a job transfer option to transfer the print job from the print queue of the multi-function device to the external storage device based on the determination of the print job of the user in the print queue of the multi-function device; and
  receive an input from the user, wherein the input is indicative of a selection of the job transfer option to transfer the print job to the external storage device;
  provide a list of at least one queued print job on the user interface of the multi-function device;
  receive a selection on the user interface of at least one queued print job from the list;
  create, by the multi-function device, a pre-defined folder in the external storage device based on receiving the input;
  transfer, by the multi-function device, the selected queued print job of the user from the print queue of the multi-function device into the pre-defined folder of the external storage device, along with job details; and
  a different multi-function device to:
  receive the external storage device storing the print job and the job details;
  identify the pre-defined folder present in the external storage device when the external storage device is connected to the different multi-function device;
  automatically load the selected queued print job and the job details from the external storage device, to a print queue of the different multi-function device, when the external storage device is connected to the different multi-function device; and
  print the print job in accordance with the job details.

29. The system as claimed in claim 28, wherein the different multi-function device is to load the print job and the job details to the print queue of the different multi-function device based on the pre-defined folder in the external storage device.

* * * * *